(12) United States Patent
Junggebauer et al.

(10) Patent No.: US 10,239,495 B2
(45) Date of Patent: Mar. 26, 2019

(54) WINDSHIELD WIPER ASSEMBLY

(71) Applicant: Volkswagen Aktiengesellschaft, Wolfsburg (DE)

(72) Inventors: Jens Junggebauer, Braunschweig (DE); Hans-Juergen Kulinna, Wesendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/418,941

(22) Filed: Jan. 30, 2017

(65) Prior Publication Data

US 2017/0136993 A1   May 18, 2017

Related U.S. Application Data

(63) Continuation of application No. PCT/EP2015/066808, filed on Jul. 22, 2015.

(30) Foreign Application Priority Data

Jul. 30, 2014   (DE) .................. 10 2014 214 985

(51) Int. Cl.
  *B60S 1/04*   (2006.01)
  *B60S 1/08*   (2006.01)
  *B60S 1/16*   (2006.01)
(52) U.S. Cl.
  CPC ............. *B60S 1/043* (2013.01); *B60S 1/0433* (2013.01); *B60S 1/0438* (2013.01);
(Continued)

(58) Field of Classification Search
  CPC ...... B60S 1/043; B60S 1/0427; B60S 1/0438; B60S 1/0441; B60S 1/0444; B60S 1/08;
(Continued)

(56) References Cited

U.S. PATENT DOCUMENTS 5,332,188 A * 7/1994 Davis ...................... F16F 15/02
                                                248/638
5,601,379 A * 2/1997 Princet .................. B60S 1/0425
                                                403/265

(Continued)

FOREIGN PATENT DOCUMENTS

DE   101 25 581 A1   12/2002
DE   102 42 298 A1    3/2004
(Continued)

OTHER PUBLICATIONS

Machine translation of description portion of Japanese publication 60-42121, published Mar. 1985.*
(Continued)

*Primary Examiner* — Gary K. Graham
(74) *Attorney, Agent, or Firm* — Muncy, Geissler, Olds & Lowe, P.C.

(57) ABSTRACT

A windshield wiper assembly for a vehicle having a drive device provided with an electric motor having a pole-well, and a transmission that can be driven by the electric motor, which is operatively connected to at least one wiper arm, and having a device for fastening the drive device to the vehicle. The device is provided with a tab surrounding the pole-well of the electric motor on the peripheral side, at least in some areas, which is provided with a free end, which protrudes from the pole-well and which is fastened to the vehicle.

12 Claims, 2 Drawing Sheets

(52) U.S. Cl.
CPC ............... *B60S 1/0441* (2013.01); *B60S 1/08* (2013.01); *B60S 1/166* (2013.01)

(58) Field of Classification Search
CPC ......... B60S 1/0433; B60S 1/166; B60J 5/101; B60J 5/107; H02K 5/00; H02K 5/04
USPC ............. 15/250.3, 250.31; 296/96.15, 96.17; 310/91, 418, 413, 426, 422
See application file for complete search history.

(56) References Cited

U.S. PATENT DOCUMENTS

| | | | |
|---|---|---|---|
| 5,956,800 A * | 9/1999 | Morin | B60S 1/04 15/250.3 |
| 6,938,511 B2 | 9/2005 | Meier et al. | |
| 7,640,619 B2 | 1/2010 | Moosmann et al. | |
| 2007/0011839 A1 | 1/2007 | Princet et al. | |
| 2007/0179117 A1 | 8/2007 | Reiner et al. | |
| 2007/0226939 A1* | 10/2007 | Takada | B60S 1/0438 15/250.31 |

FOREIGN PATENT DOCUMENTS

| | | |
|---|---|---|
| DE | 102 44 903 A1 | 4/2004 |
| DE | 10 2005 030 218 A1 | 1/2007 |
| DE | 10 2007 061 378 A1 | 6/2009 |
| DE | 20 2008 005 744 U1 | 10/2009 |
| DE | 10 2009 047 397 A1 | 6/2011 |
| EP | 1 552 994 A1 | 7/2005 |
| FR | 2 853 606 A1 | 10/2004 |
| FR | 2859403 * | 3/2005 |
| FR | 2 885 099 A1 | 11/2006 |
| FR | 2 947 786 A1 | 1/2011 |
| JP | 60-42121 * | 3/1985 |
| JP | S 60-42121 A | 3/1985 |
| WO | WO 2005/015709 A1 | 2/2005 |

OTHER PUBLICATIONS

Machine translation of description portion of French publication 2859403, published Mar. 2005.*

* cited by examiner

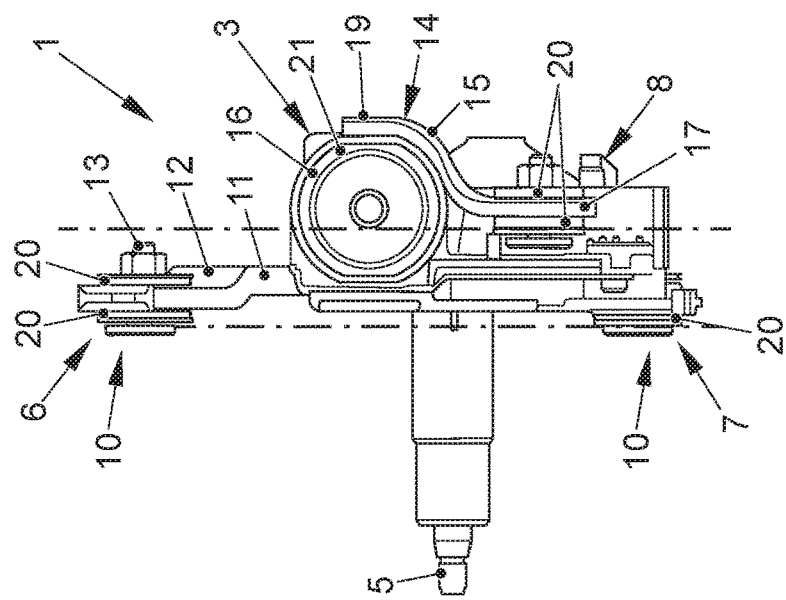
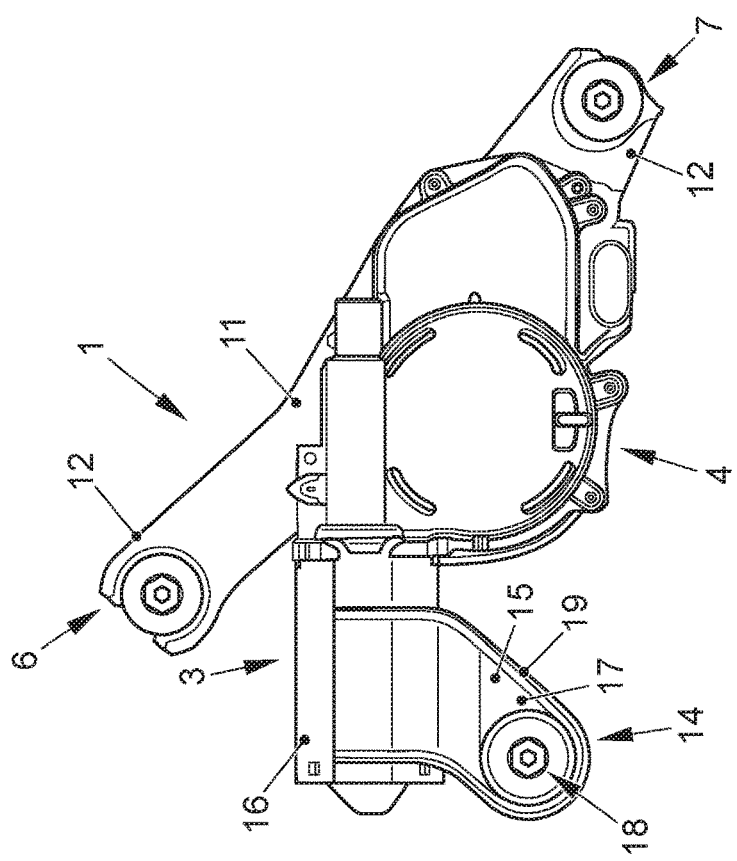
FIG. 2
FIG. 3

WINDSHIELD WIPER ASSEMBLY

This nonprovisional application is a continuation of International Application No. PCT/EP2015/066808, which was filed on Jul. 22, 2015, and which claims priority to German Patent Application No. 10 2014 214 985.1, which was filed in Germany on Jul. 30, 2014, and which are both herein incorporated by reference.

BACKGROUND OF THE INVENTION

Field of the Invention

The invention relates to a windshield wiper assembly for a vehicle, in particular a motor vehicle, comprising a drive device which includes an electric motor having a pole-well and a transmission, which is drivable by the electric motor, the transmission being operatively connected/operatively connectable to a wiper arm, and comprising a device for fastening the drive device to the vehicle.

Description of the Background Art

Windshield wiper arms are known from the related art. For example, the unexamined patent application DE 102 42 298 A1, which corresponds to U.S. Pat. No. 7,640,619, discloses a windshield wiper assembly, in which three connecting points are provided for fastening to a vehicle. One of these connecting points is assigned to a pole-well end of the electric motor and provided with a decoupling element for decoupling vibrations. The decoupling element is assigned to the pole-well end and thus to an end face of the pole-well. An electric motor is also known from the utility model specification DE 20 2008 005 744 U1, which may be fastened in a vehicle by means of a sleeve. The sleeve accommodates an (axial) pole-well end of the electric motor, so that the electric motor is supported on the pole-well end in a manner similar to that in the aforementioned publication.

SUMMARY OF THE INVENTION

It is therefore an object of the invention to provide a windshield wiper assembly for a vehicle, which facilitates an improved vibration decoupling with regard to the vehicle while maintaining at least the same load capacity of the connection of the windshield wiper assembly.

In an exemplary embodiment, the invention has the advantage that a larger surface is used, via which forces and thus vibrations at the connecting point may be absorbed and damped or decoupled. This is achieved in that the device includes a bracket, which encompasses the pole-well of the electric motor, at least in some areas, on the peripheral side and which has a free end which protrudes from the pole-well and is/may be fastened to the vehicle. Due to the fact that the bracket encompasses the pole-well on the peripheral side, the entire length of the pole-well, and possibly the width, may be used to divert forces from the pole-well into the bracket and thus into the vehicle. Due to the large contact surface, vibrations may therefore be particularly advantageously compensated for or decoupled. At the same time, a secure fastening of the pole-well or the electric motor is ensured, and thus the windshield wiper assembly to the vehicle. Multiple connecting points for the windshield wiper assembly are provided as usual on the vehicle, one connecting point being made available by the aforementioned device and the other connecting points being made available in the conventional manner. In particular, the two remaining connecting points are not assigned to the electric motor but rather to the transmission, in particular to a transmission housing of the transmission.

According to an embodiment of the invention, the bracket can extend over the periphery of the pole-well by at least 25°, in particular by at least 45°, preferably by 90°. The bracket thus encompasses at least one peripheral section of the pole-well. An advantageous support of the pole-well is ensured thereby. Due to the contact of the bracket on the pole-well, a heat dissipation into the vehicle is also preferably made available.

The bracket can be provided with a vibration-damping design, at least in sections. As a result, vibrations are already damped by the bracket. In particular, the bracket is also designed to be elastically deformable, at least in sections, the elastic constant being selected in such a way that an advantageous vibration decoupling takes place. The damping effect is advantageously also influenced by the width and thickness of the bracket as well as the bracket profile. In particular, the bracket has a curved profile from the free end used for fastening to the vehicle to the section encompassing the pole-well.

The bracket furthermore includes at least one reinforcement rib. This makes it possible to achieve a sufficient damping effect for decoupling vibrations even with a comparatively small/slight material thickness of the bracket. Moreover, the stability and robustness of the fastening of the windshield wiper assembly to the vehicle is increased.

The reinforcement rib can extend along an edge section of the bracket. The reinforcement is increased thereby, particularly in the edge area.

The reinforcement rib can extend from the end of the bracket facing the pole-well, along the edge of the bracket, around the end used for fastening and back to the end of the bracket assigned to the pole-well. A particularly advantageous damping effect and robustness of the windshield wiper assembly is ensured hereby.

The free end of the bracket can be provided with a curvature, so that the reinforcement rib also has a curved profile. The reinforcement rib can be manufactured by, for example, a forming process of the bracket. In particular, the bracket can be designed as a stamped/bent component, which is brought into the designed shape with the bent reinforcement rib in one machining step. The bracket can be produced from a metal. In an embodiment, the bracket can be alternatively produced from plastic, reinforcement ribs or the reinforcement rib being designed to form a single piece with the bracket in both cases, i.e., regardless of the material.

According to an embodiment of the invention, the bracket can be integrally fastened to the pole-well. For this purpose, the bracket is, for example, glued or welded on a housing of the pole-well. A particularly easy fastening of the bracket to the pole-well is ensured hereby, which furthermore ensures a good seating contact of the bracket on the pole-well.

The bracket can be fastened to the pole-well in a form-fitting manner. For this purpose, the bracket may, for example, encompass the pole-well to the extent that a form-fitting connection is established. This provides, in particular, the advantage of a non-destructible, lockable connection. It is furthermore conceivable to lock the bracket on the pole-well by means of at least one latching device. For this purpose, latching receptacles, for example, may be provided on the housing, which correspondingly interact with latching tabs of the bracket. Alternatively or additionally, the bracket is preferably screwed on the pole-well, in particular on the housing of the pole-well.

According to an embodiment of the invention, the pole-well can have a housing, a housing section of the housing being formed by the bracket. Since the bracket encompasses the pole-well on the peripheral side, a jacket wall section of the housing of the pole-well is thus formed by the bracket. An advantageous integration of the bracket or the device for fastening the pole-well to the vehicle into the pole-well results hereby. This reduces the number of parts as well as the assembly and manufacturing complexity.

A decoupling element for decoupling vibrations can be assigned to the free end of the bracket, which is used to fasten the bracket to the vehicle. An additional vibration decoupling can be made available hereby, which supports the vibration damping of the bracket. The decoupling element can include at least one elastomer element for damping. The decoupling element can be designed as a ring element, which is penetrated on the free end by a screw fastening the bracket to the vehicle, so that it is clamped between the screw head and the fastening bracket or between the fastening bracket and the vehicle.

According to an embodiment of the invention, the bracket can extend around the periphery of the pole-well by 170° to 190°, in particular 180°. As a result, the pole-well as a whole can be encompassed by the least one bracket on its side facing away from the vehicle. For this purpose, the bracket can have an essentially semicircular section encompassing the pole-well and a section, which protrudes, for example, perpendicularly or substantially perpendicular from the pole-well and includes the free end of the bracket—in a longitudinal sectional view. In each case, the contour of the section of the bracket encompassing the pole-well is adapted to the contour of the pole-well or to the jacket wall of the pole-well, so that a preferably large surface contact is ensured between the bracket and the pole-well.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a top view of the windshield wiper assembly; and

FIG. 3 shows a side view of the windshield wiper assembly.

DETAILED DESCRIPTION

Figure 1:
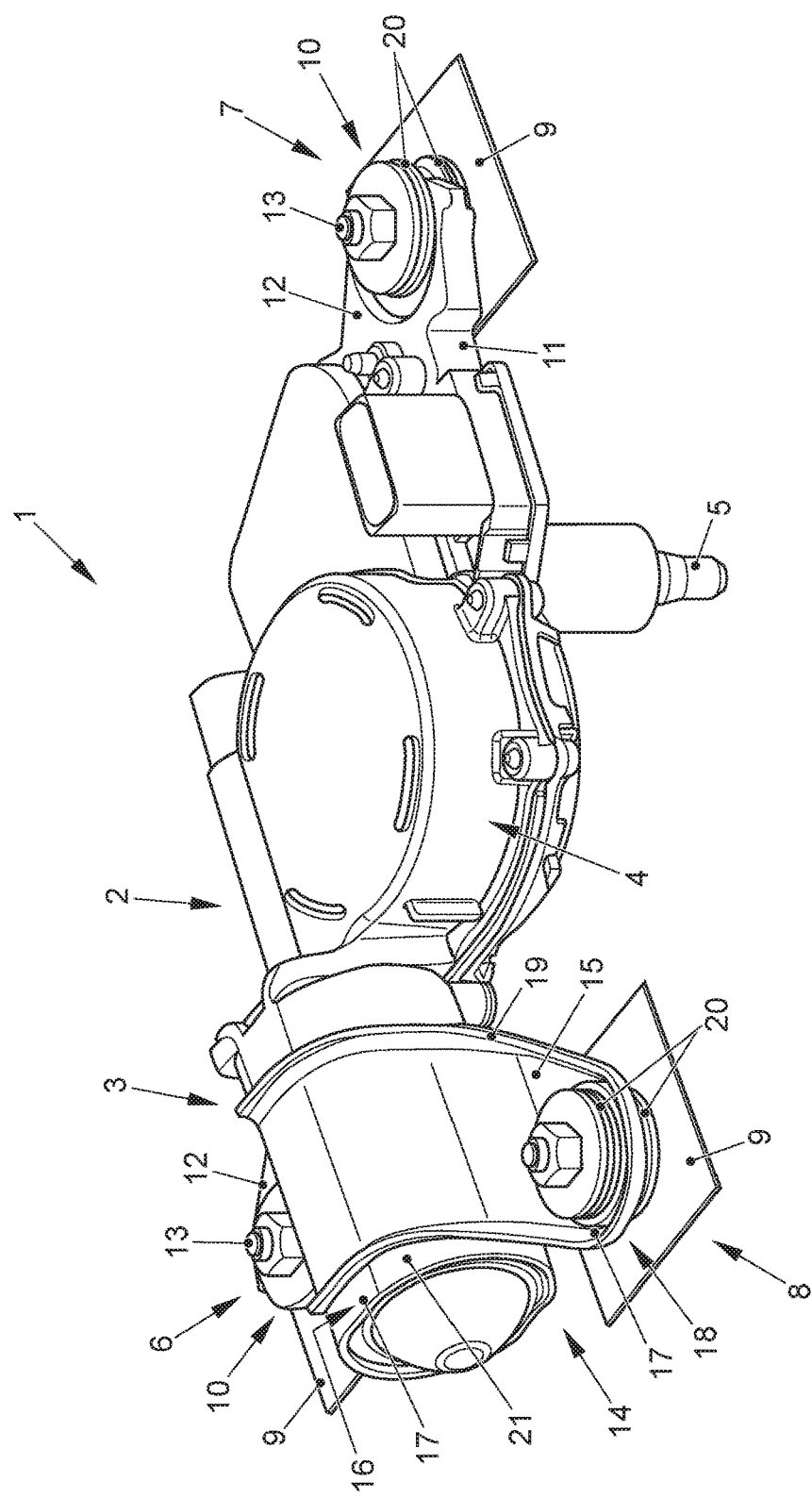
FIG. 1 shows a perspective representation of a windshield wiper assembly.

FIG. 1 shows a perspective representation of one exemplary embodiment of an advantageous windshield wiper assembly 1. Windshield wiper assembly 1 comprises a drive device 2, which is essentially formed by an electric motor 3, and a transmission 4, which is drivable by electric motor 3. A drive shaft 5 of the transmission, which is designed in the present case as a worm wheel transmission, forms a drive shaft of a wiper arm of windshield wiper assembly 1 or is operatively connected or operatively connectable to a corresponding drive shaft.

Windshield wiper assembly 1 is fastened by three connecting points 6, 7 and 8 to a vehicle 9, which is indicated herein as surface elements 9 represented by the area of connecting points 6, 7, 8. Connecting points 6, 7 are designed in the conventional manner. For this purpose, connecting points 6, 7 each include a screw connection 10 which comprises a decoupling device. Connecting points 6, 7 are assigned to a transmission housing 11 of transmission 4. Transmission housing 11 has a fastening flange 12, diametrically opposed in each case, on which particular connecting point 6, 7 is provided. A screw 13 penetrates particular fastening flange 12, for the purpose of clamping a decoupling element 20, in the form of an elastomer ring for the purpose of decoupling vibrations, between fastening flange 12 and vehicle 9 as well as between a screw nut and the fastening flange.

Connecting point 8 differs from connecting points 6, 7 by a device 14, which includes an essentially rigid bracket 15 for fastening electric motor 3 to vehicle 9. Bracket 15 is assigned to a pole-well 16 of electric motor 3.

FIG. 2, which illustrates the windshield wiper assembly in a top view, and FIG. 3, which illustrates the windshield wiper assembly in a side view, clearly show that bracket 15 extends around the periphery of pole-well 16 by approximately 90°, and has a free end 17, which is connected to vehicle 9 by a screw connection 18, which protrudes or faces away from pole-well 16. In the present exemplary embodiment, screw connection 18 corresponds to the particular screw connection of connecting points 6 and 7, including two decoupling elements 20 clamped between the bracket and the screw nut or between the bracket and vehicle 9. In the side view according to FIG. 3, bracket 15 has a curved, in particular nearly S-shaped, contour, so that free end 17 of bracket 15 is essentially the same height as the rotation axis or the central axis of pole-well 16 or electric motor 3. In the area of pole-well 16, the contour of bracket 15 corresponds to the jacket outer surface or outer contour of pole-well 16, so that bracket 15 encompasses pole-well 16 by approximately 45° and rests thereupon. Bracket 15 is advantageously glued to pole-well 16.

Vibrations are transmitted from pole-well 16 to bracket 15 during operation, bracket 15 having a damping effect on the vibrations due to its curved shape. Screw connection 18, with its additional vibration decoupling function, damps the remaining vibrations, so that almost no vibrations that could disturb the driving comfort of the occupants of the vehicle due to disruptive noises or the like are introduced into vehicle 9.

In the present exemplary embodiment, bracket 15 is produced from a metal and is designed as a stamped/bent sheet metal part. To increase the damping effect and to increase the robustness, bracket 15 includes a reinforcement rib 19, as is apparent, in particular, in FIG. 1. Reinforcement rib 19 extends along the edge of bracket 15. Reinforcement rib 19 extends along the edge from pole-well 16 to connecting point 8 or around free end 17 and back to pole-well 16, i.e., up to the end opposite free end 17. Reinforcement rib 19 is manufactured, in particular, by the bending process.

According to an alternative embodiment, bracket 15 as a whole may be manufactured from a plastic material. It is also possible for the bracket to encompass pole-well 16 by approximately 180° to ensure a higher load capacity of the fastening. It is also conceivable and preferred that bracket 15 is designed as part of a housing 21 of pole-well 16, so that, in particular, a housing jacket wall section of housing 21 or of pole-well 16 is formed by bracket 15. This results in an advantageous integration of bracket 15 into pole-well 16.

Due to the provision of bracket 15, different fastening levels may be easily provided for connecting points 6, 7, 8, as is apparent in FIG. 3, in which connecting points 6, 7 are situated in one plane and connecting point 8 is situated in a second plane situated at a distance therefrom.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A windshield wiper assembly for a vehicle, comprising:
   at least one wiper arm;
   a drive device that includes an electric motor having a pole-well and a transmission, which is drivable by the electric motor and is operatively connected/operatively connectable to the at least one wiper arm; and
   a fastener adapted to fasten the drive device on the vehicle, the fastener having a bracket that encompasses the pole-well of the electric motor at least in some areas, the bracket having a first end and a second end, the first end attaching to the pole-well and the second end being a free end that protrudes from the pole-well and is fastened to the vehicle at a connecting point,
   wherein the bracket has a bottom surface that faces the connecting point and the pole-well and an upper surface that faces away from the connecting point and the pole-well,
   wherein the bracket includes at least one reinforcement rib that protrudes from the upper surface of the bracket in a direction away from the connecting point and the pole-well, the at least one reinforcement rib extending along peripheral edges of the upper surface of at least the free end of the bracket, and
   wherein the free end of the bracket is a planar portion that extends along a plane and wherein a rotating axis of the pole-well lies in the plane of the free end of the bracket, such that in a height direction that extends from a bottom of the pole-well to a top of the pole-well to which the first end of the bracket is attached, the free end of the bracket is positioned at a same height as the rotating axis of the pole-well.

2. The windshield wiper assembly according to claim 1, wherein the bracket extends along the periphery of the pole-well over at least 25°.

3. The windshield wiper assembly according to claim 1, wherein the bracket has a vibration-dampening effect at least in sections.

4. The windshield wiper assembly according to claim 1, wherein the bracket is integrally fastened to the pole-well.

5. The windshield wiper assembly according to claim 1, wherein the bracket is fastened to the pole-well in a form-fitting manner.

6. The windshield wiper assembly according to claim 1, wherein the pole-well has a housing, and wherein a housing jacket wall section of the housing being formed by the bracket.

7. The windshield wiper assembly according to claim 1, wherein a decoupling element for decoupling vibrations is assigned to the free end of the bracket.

8. The windshield wiper assembly according to claim 1, wherein the bracket extends along the periphery of the pole-well by 170° to 190°.

9. The windshield wiper assembly according to claim 1, wherein the bracket extends along the periphery of the pole-well by 180°.

10. The windshield wiper assembly according to claim 1, wherein the bracket is s-shaped.

11. The windshield wiper assembly according to claim 1, wherein the upper surface of the bracket extends continuously from the first end to the second end.

12. The windshield wiper assembly according to claim 1, wherein the at least one reinforcement rib extends perpendicularly from the planar portion of the free end of the bracket.

* * * * *